No. 637,410. Patented Nov. 21, 1899.
G. H. POND.
PROCESS OF AND APPARATUS FOR DISSOCIATING SUBSTANCES BY ELECTROLYSIS.
(Application filed Mar. 7, 1899.)
(No Model.) 2 Sheets—Sheet 1.

WITNESSES:

INVENTOR
G. H. Pond

No. 637,410. Patented Nov. 21, 1899.
G. H. POND.
PROCESS OF AND APPARATUS FOR DISSOCIATING SUBSTANCES BY ELECTROLYSIS.
(Application filed Mar. 7, 1899.)
(No Model.) 2 Sheets—Sheet 2.

WITNESSES: INVENTOR

UNITED STATES PATENT OFFICE.

GOLDSBURY HARDEN POND, OF ASHBURNHAM, MASSACHUSETTS.

PROCESS OF AND APPARATUS FOR DISSOCIATING SUBSTANCES BY ELECTROLYSIS.

SPECIFICATION forming part of Letters Patent No. 637,410, dated November 21, 1899.

Application filed March 7, 1899. Serial No. 708,121. (No model.)

*To all whom it may concern:*

Be it known that I, GOLDSBURY HARDEN POND, a citizen of the United States of America, residing at Ashburnham, in the county of Worcester and State of Massachusetts, have invented certain new and useful Improvements in Processes of and Apparatus for Decomposing or Dissociating Substances by Electrolysis, of which the following is a specification.

My invention has relation to improvements in processes and apparatus for dissociating substances by electrolysis; and the objects are, first, to provide an improved process whereby substances the constituents or component elements of which are subject to separation by electrical currents passed through them may be more expeditiously, thoroughly, and cheaply dissociated, and, second, to provide a novel and efficient apparatus for use in carrying out the improved process.

My invention therefore consists, first, in the process wherein the substance to be treated is confined between vertically-disposed electrodes, then feeding a liquid solvent thereto by capillary attraction and delivered to the opposing faces of the electrodes, and then passing an electric current through the electrodes and intermediate substance, as will be hereinafter more fully specified, and, second, my invention involves and embraces an improved apparatus for effecting and carrying out the process, as will be fully described, and the novelty particularly pointed out in the claims.

The apparatus forming a part of my present invention is fully and clearly illustrated in the accompanying drawings, wherein—

Figure 1:
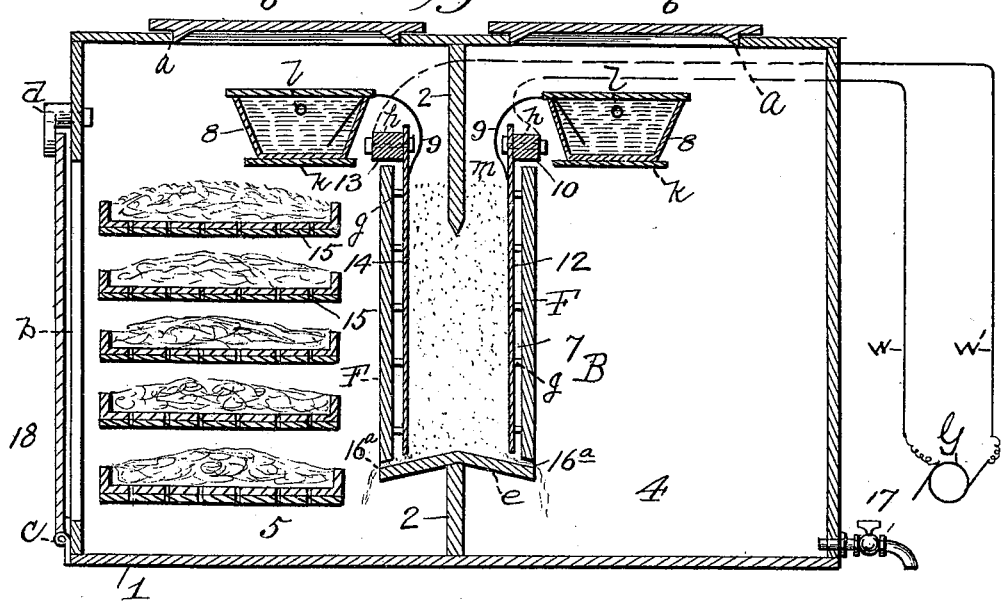
Figure 2:
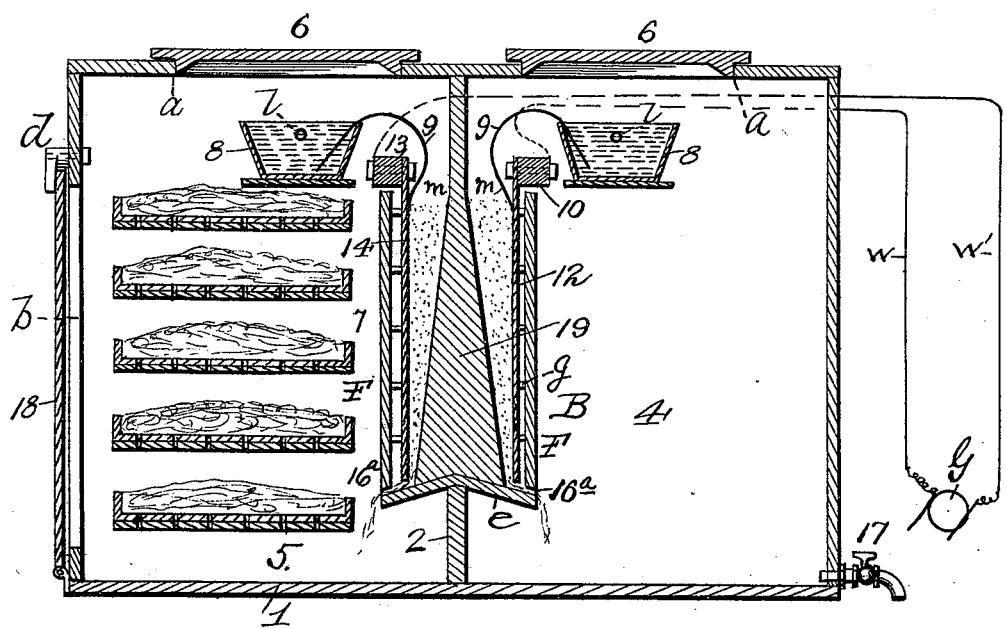
Figure 3:
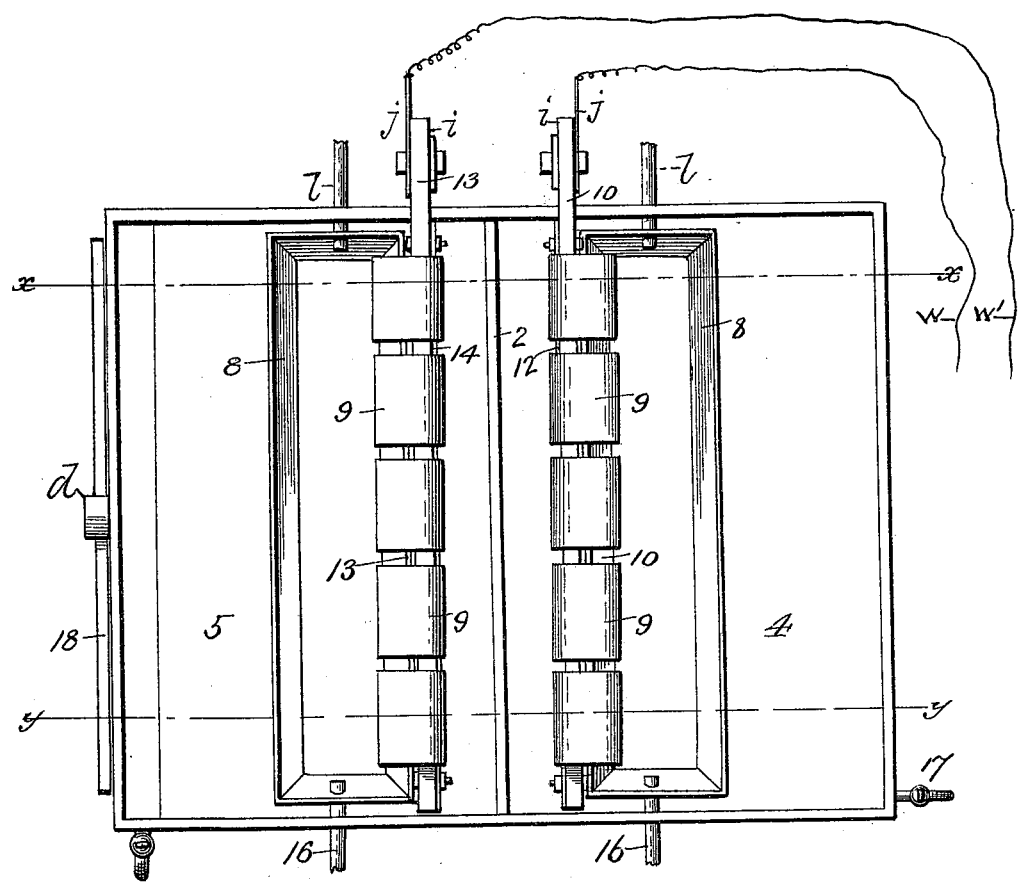

Figure 1 is a transverse vertical section through the casing or box, showing the solvent-solution troughs or tanks, the electrolytic cell, with the electrodes arranged therein, with the granular substance or material in the cell between the electrodes, and the pans for holding absorbent material arranged in one of the chambers of the casing. Fig. 2 is a transverse vertical section generally identical to that shown in Fig. 1, excepting that the cell is provided with a vertical porous partition, flaring or wedge-shaped downward for the greater portion of its length. Fig. 3 is a top plan view showing the solution troughs or tanks with the capillary conductors or feeders arranged therein and in contact with the inner faces of the electrodes. In this figure the cover and the top closures are removed.

Referring to the drawings, 1 designates the casing, made of any suitable non-conducting material, such as seasoned wood or slate, and preferably rectangular in shape, substantially as indicated in the drawings. In the top plate or cover of the casing are formed openings $a\ a$, through which access to the respective chambers or compartments of the casing may be had. These openings are closed by means of doors or lids 6 6, fitted thereto. In the end wall of the casing, being the outer wall of the chlorin-chamber, or the chamber into which the gaseous elements are carried, is formed a large opening $b$, which is closed by a door 18, hinged at its lower end to the lower part of the casing, as at $c$, and held closed and sealed by a suitable latch or fastening, as $d$. The door 18 affords access to the chamber 5 for the introduction and removal of the pans containing an absorbent material.

B designates the electrolytic cell, made of a suitable impervious non-conducting material and formed with a double inclined bottom $e$, the inclines of which are directed downward from the center or middle in order that the products of the electrolysis may find ready escape into the respective compartments designed to receive them. The sides F F rise vertically from the bottom to such height as may be desired or required and extend across the casing, an escape slot or port $16^a$ being formed between the lower edge of each side and the bottom, through which the separated elements are discharged into the respective compartments, substantially as indicated in Figs. 1 and 2 of the drawings. From the inner vertical face of each side of the cell project non-conducting horizontal pins $g$, the free ends of which are in vertical alinement and against which the outer faces of the respective electrode-plates rest, as shown in the drawings. The cell as a whole is supported on and secured in a central impervious partition 2, which also divides the casing 1 into two compartments 4 5.

12 and 14 designate the respective electrodes, composed of plates of suitable material having positive and negative electrical relations. In the instance intended by the illustrations, designed to dissociate chlorid of sodium into chlorin and caustic soda, the electrode 14 is the anode and is composed of carbon, and the electrode 12 is composed of iron and constitutes the cathode. The respective plates or electrodes are suitably secured at their upper ends, as by bolts $h$, to supporting-bars 10 13 and depend vertically therefrom, with their lower ends adjacent to but free from the bottom of the cell, as seen in Figs. 1 and 2 of the drawings. The bars 10 13 at one end project outward beyond the side of the casing, as at $i$, and have conducting-plates $j$ secured thereto, to which the respective wires $w$ $w'$ of an electric generator G, of any suitable character, are connected. In the cell between the said plates is deposited the substance or material (designated by $m$) to be dissociated, such as chlorid of sodium or common salt. In some instances a porous partition 19 is preferred, which is interposed in the cell, as shown in Fig. 2 of the drawings, which partition is seated on the bottom of the cell, and the substance to be acted upon is packed or stored in the cell on both sides of the porous partition. This partition 19 is preferably made of porous sandstone, but of course may be made of any other porous material capable of withstanding electrolytic action, and is formed, preferably, tapering from its bottom upward, as shown, the taper extending well upward toward the top of the cell. The partition arrests the diffusion of the products of electrolysis and at the same time, being porous, permits the current to flow unobstructed, but keeping the dissociated products from each electrode separate and free to reach their respective depository. The inclined surfaces of the porous partition tend to press the granular material against the faces of the electrode-plates, while the increasing thickness of the porous partition does not detrimentally affect the progress of the current. The dampened salt in the cell is permanent as a medium of transmission between the electrodes and is not reduced by the action of the descending saturated solution, because this solution is already saturated with all the salt it can carry. Hence the salt packed in the cell does not waste or change as long as it is kept in the proper state of dampness.

8 8 designate troughs or tanks mounted and supported on shelves $k$, secured across each compartment of the casing, and in these tanks is a supply of saturated liquid suited to combine with and produce the desired saturation of the material to be dissociated. The supply of liquid is conducted to the tanks by pipes $l$ $l$, leading therein from any provided reservoir. To carry this liquid from the tanks into contact with the respective electrodes, I provide suitable textile feeders or aprons 9, arranged with one end in the tanks and having their other end resting against the respective inner faces of the electrodes. Thus the solvent is fed to the electrodes directly to their inner faces, down which it runs in contact with the contiguous surface of the material in the cell. The caustic soda or heavier product of the dissociated material is drawn off by means of a spigot 17 at the bottom of the casing. In the chlorin-compartment are arranged on suitable supports a number of pans 15, having foraminous bottoms in which lime is deposited, which absorbs the liberated or loose chlorin.

It will be perceived from the foregoing description, taken in connection with the drawings, that the electrodes are disposed vertically in the cell, which enables the use of a minimum quantity of the solvent liquid to produce the desired effect. The electrodes are supplied with the solvent by capillary process, by which it is carried directly in a thin layer or sheet to the faces of the electrodes, where as fast as it is received on the plate it is carried down and out by gravity through the apertures or escapes provided for it, being dissociated during its descent. In this descent there is little or no diffusion of the solvent promiscuously throughout the substance, since it seeks the easiest route, being that on the face of the electrodes, but in its course perfect or complete dissociation results. The cell may be used as an open cell or used with the porous partition. In either instance the process and operation are as follows: The cell is provided with the required quantity of dampened or wetted salt, which packs against the inner faces of the electrodes, which in the present case, as hereinbefore mentioned, are carbon and iron. Then a saturated solution of salt, being the solvent liquid, is supplied from the tanks, from which the capilliary feeders transfer it to the face of the electrodes, down which it travels, and then bring into requisition the electric current. The salt solution is dissociated into its constituent elements—chlorin and caustic soda—the former appearing at the anode 14 and discharging into the compartment 5 and the latter appearing at the cathode 12 and discharging into the compartment 4.

Having thus described my invention, what I claim, and desire to secure by Letters Patent, is—

1. The herein-described process for dissociating salts electrically, which consists in packing a soluble salt between two vertical electrodes, then feeding a saturated solution of the same salt to the inner face of each electrode, and passing an electric current through the electrodes, packed material and descending film of saturated material.

2. The herein-described process for dissociating salts electrically, which consists in packing a soluble salt between two vertical electrodes and an interposed porous partition, then feeding by capillary attraction a film of saturated solution of the same salt to the inner face of each electrode, and passing an electric current through the electrodes, material and the interposed porous partition.

3. An apparatus for electrically decomposing salts, comprising a casing divided into compartments, an electrolytic cell supported and mounted in the casing and provided with escape-passages at its lower end, electrode-plates vertically disposed in the cell and arranged to receive and hold a soluble salt between them, troughs supported in each compartment to hold a solution of the substance to be dissociated, and capillary conductors in the troughs arranged with their free ends in contact with the inner faces of the electrode-plates, substantially as described.

4. An apparatus for electrically decomposing salts, comprising a suitable casing divided into compartments, an electrolytic cell supported and mounted in the casing and provided with escape-passages at its lower end, and the vertical side walls of the cell being provided with inwardly-directed pins, electrode-plates vertically disposed in the cell and arranged to receive and hold a soluble salt between them, troughs supported in each compartment to hold a saturated solution of the substance to be dissociated, and capillary conductors leading from the troughs to the inner faces of the electrode-plates, substantially as described.

5. In an apparatus of the class herein described, the combination with a suitable casing divided into compartments to receive the respective products of the electrolysis, of an electrolytic cell having vertical sides, a double incline bottom, and passages between the bottom and the lower edges of the sides, vertically-disposed electrode-plates in the cell, and capillary conductors to convey a solution to the plates, substantially as and for the purpose set forth.

6. In an apparatus of the class herein described, the combination with a suitable casing divided into two compartments to receive the respective products of electrolysis, of an electrolytic cell having vertical sides, a double incline bottom and passages between the bottom and the lower edges of the sides, a porous partition vertically interposed in the cell, vertically-arranged electrode-plates on each side of the porous partition, and capillary conductors to lead a solution to the inner face of each electrode-plate, substantially as described.

7. The apparatus for dissociating a substance electrically, comprising a rectangular casing having openings in the top, lids to close the openings, and a door at the side and divided into two compartments to receive the respective dissociated elements, an electrolytic cell mounted in the casing and having passages at its bottom to discharge into the respective compartments, vertically-disposed electrode-plates disposed in the cell with a space between them, solution-troughs adjacent to the upper end of the cell, and capillary feeders to take the solution from the troughs and carry it to the inner face of each electrode, substantially as described.

GOLDSBURY HARDEN POND.

Witnesses:
H. M. POND,
GEORGE E. GARTLAND.